(12) United States Patent
McLaren et al.

(10) Patent No.: US 8,938,139 B2
(45) Date of Patent: Jan. 20, 2015

(54) OPTOELECTRONIC SWITCHES USING ON-CHIP OPTICAL WAVEGUIDES

(75) Inventors: Moray McLaren, Bristol (GB); Jung Ho Ahn, Palo Alto, CA (US); Nathan L. Binkert, Redwood City, CA (US); Alan L. Davis, Coatville, CA (US); Norman Paul Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 659 days.

(21) Appl. No.: 12/921,768

(22) PCT Filed: Mar. 11, 2008

(86) PCT No.: PCT/US2008/003244
§ 371 (c)(1),
(2), (4) Date: Dec. 7, 2010

(87) PCT Pub. No.: WO2009/113977
PCT Pub. Date: Sep. 17, 2009

(65) Prior Publication Data
US 2011/0069963 A1 Mar. 24, 2011

(51) Int. Cl.
*G02B 6/26* (2006.01)
*G02B 6/12* (2006.01)
*G02F 1/313* (2006.01)
*H04Q 11/00* (2006.01)
(Continued)

(52) U.S. Cl.
CPC ........ *G02B 6/12007* (2013.01); *G02B 6/29338* (2013.01); *G02B 6/35* (2013.01); *G02B 6/3546* (2013.01); *G02B 6/356* (2013.01); *G02F 1/3137* (2013.01); *G02F 1/3138* (2013.01);

*G02F 2201/17* (2013.01); *G02F 2202/32* (2013.01); *G02F 2203/15* (2013.01); *H04Q 11/0005* (2013.01); *H04Q 11/0066* (2013.01); *H04Q 2011/0016* (2013.01); *H04Q 2011/0035* (2013.01); *H04Q 2011/0058* (2013.01)
USPC .............................................. 385/20; 385/17

(58) Field of Classification Search
CPC ..................... G02B 6/29338; G02B 6/29395
USPC .............................................. 385/17, 20, 21
See application file for complete search history.

(56) References Cited

U.S. PATENT DOCUMENTS 4,815,803 A * 3/1989 Faulkner et al. ................ 385/24
6,411,752 B1 * 6/2002 Little et al. ..................... 385/17
(Continued)

FOREIGN PATENT DOCUMENTS

JP 62-245228 10/1987
JP 2-136805 5/1990
(Continued)

OTHER PUBLICATIONS

ISR dated Sep. 25, 2008.

*Primary Examiner* — Charles Y Peng

(57) ABSTRACT

Embodiments of the present invention are directed to optoelectronic network switches. In one embodiment, an optoelectronic switch includes a set of roughly parallel input waveguides and a set of roughly parallel output waveguides positioned roughly perpendicular to the input waveguides. Each of the output waveguides crosses the set of input waveguides. The optoelectronic switch includes at least one switch element configured to switch one or more optical signals transmitted on one or more input waveguides onto one or more crossing output waveguides.

18 Claims, 15 Drawing Sheets

(51) Int. Cl.
*G02B 6/293* (2006.01)
*G02B 6/35* (2006.01)

(56) References Cited

U.S. PATENT DOCUMENTS

| | | | |
|---|---|---|---|
| 6,539,143 B1 * | 3/2003 | Hunter | 385/19 |
| 6,636,668 B1 * | 10/2003 | Al-hemyari et al. | 385/40 |
| 7,003,190 B2 | 2/2006 | Zhang et al. | |
| 8,009,943 B2 * | 8/2011 | Bratkovski et al. | 385/16 |
| 2003/0108274 A1 * | 6/2003 | Haronian | 385/17 |
| 2012/0321241 A1 * | 12/2012 | Julien et al. | 385/3 |

FOREIGN PATENT DOCUMENTS

| | | |
|---|---|---|
| JP | 2005-128442 | 5/2005 |
| JP | 2007-508585 | 4/2007 |
| JP | 2008-517332 | 5/2008 |

\* cited by examiner

OPTOELECTRONIC SWITCHES USING ON-CHIP OPTICAL WAVEGUIDES

TECHNICAL FIELD

Embodiments of the present invention are directed to optoelectronic devices, and, in particular, to optoelectronic switches.

BACKGROUND

Switch networks are employed to route data from output ports to input ports of various kinds of nodes, including processors, memory, circuit boards, servers, storage servers, external network connections or any other data processing, storing, or transmitting device. In large scale computer systems, scalable packet switch networks are used to connect ports. In order to build switch networks that can scale to a large number of ports, it is desirable for the basic switch component to have as many inputs and outputs as possible. This means that a switch network that can span all the ports and can be constructed with fewer stages. In switch networks with N log (N) growth characteristics, such as Clos networks, this is termed a high radix router, since a large switch component size reduces the logarithmic growth term in network complexity. Where electronic devices are used for switching, the overall external bandwidth of each switch component is constrained so that the system designer is forced to compromise between the number of channels on and off the switch, and the bandwidth of the channels. For example, the same silicon technology can implement a 64×64 switch with each channel operating at 40 Gbit/s or a 16×16 switch with each channel operating at 160 Gbit/s. This constraint arises for the maximum number of signal connections for a package and the data rate for the signals themselves. The signal data rate is determined by the power and signal integrity considerations.

Switch networks can often be a data processing bottleneck for computing environments. A typical switch network, for example, can limit the scope of a computing environment's ability to handle the ever increasing data processing and transmission needs of many applications, because many switch networks are fabricated to accommodate only the "port-rate of the day" and the "port-count of the day" and are not fabricated to accommodate larger bandwidths that may be needed to effectively accommodate future applications. In particular, the amount and frequency with which data is exchanged between certain ports can be larger for some ports than for others, and the use of low-latency, metal-signal lines employed by most switch networks have limited bandwidths. As a result, the amount of data that can be transmitted between ports may not be well matched to the data transfer needs of the ports employed by an application at each point in time, which often results in data processing and/or transmission delays. Switch networks have a large number of long signal line intra-chip connections arising from the need to connect any input to any output. These long signal lines consume significant amounts of power in the repeaters needed to overcome electronic transmission losses.

A number of the issues associated with electronic signals transmitted via signal lines can be significantly reduced by encoding the same information in particular wavelengths or channels of light transmitted via waveguides. First, the data transmission rate can be increased significantly due to the much larger bandwidth provided by waveguides. Second, degradation or loss per unit length is much less for light transmitted via waveguides than for electronic signals transmitted via signal lines. Thus, power consumption per transmitted bit is lower for light transmitted via waveguides than for transmitting the same data in electronic signals via signal lines.

Optical switch components have been constructed using a variety of different technologies such as micro-electro-mechanical systems, and magneto optic effects. However, these switches are all circuit switches, where configuring the switch is performed by a separate, generally electronic, control plane. A packet switch is distinguished from a circuit switch by the ability to make connections according to routing information embedded in the input data stream. A packet switch typically permits buffering of input data when the requested output is in use. Many electronic packet switches have been constructed. However, these network switches are limited in their ability to scale to meet demands of future higher performance processors. There are two limiting factors. First, the bandwidth on and off the router chips is limited, both in terms of the number of input/outputs ("IOs"), limited by packaging technology, and IO speed which is limited by signal integrity considerations. Second, the power required for the inter- and intra-chip communications grows significantly with higher IO counts and higher data rates.

Engineers have recognized a need for fast network switches that can accommodate data encoded light as a medium for transmitting massive amounts of data between various kinds of data processing, storing, or transmitting devices.

SUMMARY

Embodiments of the present invention are directed to optoelectronic network switches. In one embodiment, an optoelectronic switch includes a set of roughly parallel input waveguides and a set of roughly parallel output waveguides positioned roughly perpendicular to the input waveguides. Each of the output waveguides crosses the set of input waveguides. The optoelectronic switch includes at least one switch element configured to switch one or more optical signals transmitted on one or more input waveguides onto one or more crossing output waveguides.

DETAILED DESCRIPTION

Figure 1:
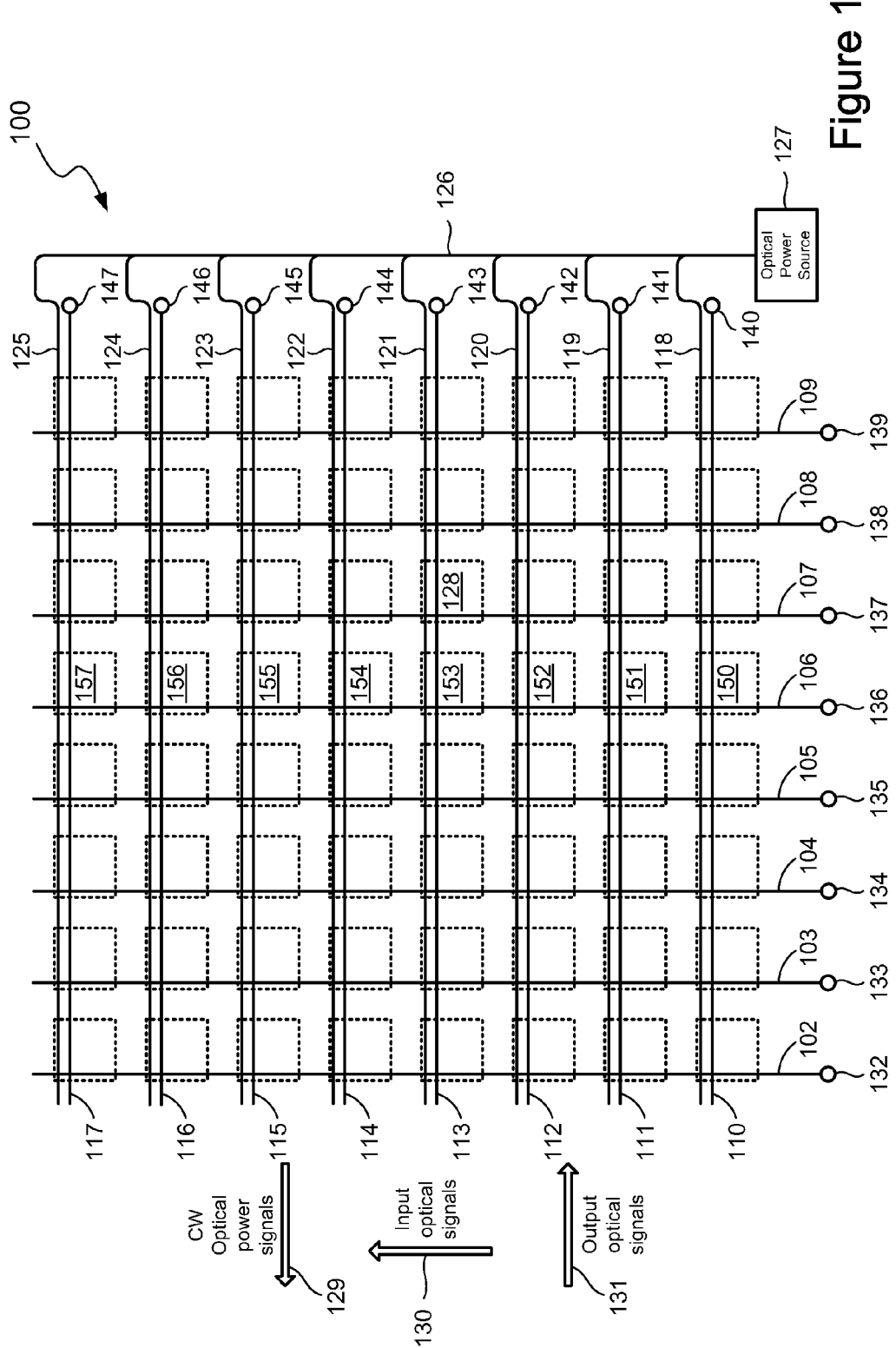
FIG. 1 shows a schematic representation of a first optoelectronic network switch configured in accordance with embodiments of the present invention.

Various embodiments of the present invention are directed to optoelectronic network switches. These embodiments greatly increase input and output bandwidth through the use of direct nanophotonic interconnects that need less power than electronic interconnects for high bandwidth chip-to-chip interconnections. In addition, embodiments of the present invention employ dense wave-division multiplexing ("DWDM") to connect numerous optical signals to a device. DWDM is multiplexing optical signals of different wavelengths on a single waveguide. The network switches include switch elements that connect input waveguides with output waveguides and distribute optical signals to multiple ports. Embodiments of the present invention exploit the ability of optical signals to connect with many points across the switch to eliminate the need for long internal electronic connections. Above a certain distance threshold, optical on-chip communication is more efficient than electronic communication, as the lower transmission loss, for a given distance, of optical waveguides obviates the need for repeaters.

In describing embodiments of the present invention, the term "optical signal" refers to electromagnetic radiation of a particular wavelength that has been modulated or turned "on" and "off" to encode data. For example, high and low amplitude portions of an optical signal may correspond to the bits "1" and "0," respectively, or "on" and "off" portions of an optical signal may correspond to the bits "1" and "0," respectively. The "optical signals" are not limited to wavelengths that lie in just the visible portion of the electromagnetic spectrum but can also refer to classical and quantum electromagnetic radiation with wavelengths outside the visible portion, such as the infrared and ultraviolet portions. A number of structurally similar components comprising the same materials have been provided with the same reference numerals and, in the interest of brevity, an explanation of their structure and function is not repeated.

FIG. 1 shows a schematic representation of an optoelectronic network switch 100 configured in accordance with embodiments of the present invention. The switch 100 includes a set of eight vertical input waveguides 102-109, a set of eight horizontal output waveguides 110-117, and a set of eight horizontal optical power waveguides 118-125 that are roughly parallel to the output waveguides 110-117. The power waveguides 118-125 are optically coupled to a source waveguide 126, which, in turn, is optically coupled to an optical power source 127. The input waveguides 102-109 are oriented roughly perpendicular to the output and power waveguides 110-125 and each input waveguide crosses the output and power waveguides 110-125 and is optically coupled to each output waveguide via a switch element, such as switch element 128, represented in FIG. 1 by a dashed line box. As shown in FIG. 1, the switch 100 includes an 8×8 array of switch elements where each switch element includes an input waveguide crossing an output waveguide. For example, the switch element 128 includes the input waveguide 107 crossing the output waveguide 113. Switch element embodiments are described in greater detail below with reference to FIGS. 2-3.

The waveguides 102-126 are each capable of carrying multiple optical signals using DWDM. The optical power source 127 outputs a number of continuous wave ("CW") (i.e., unmodulated or roughly constant amplitude and wavelength) lightwaves onto the source waveguide 126 using DWDM, each lightwave having a different wavelength. A portion of each lightwave is coupled into each of the power waveguides 118-125 so that each of the power waveguides 118-125 carry the same set of lightwaves output from the optical power source 127. The lightwaves are transmitted along the power waveguides 118-125 in the direction identified by directional arrow 129. The input waveguides 102-109 are coupled separately to input ports 132-139, respectively, and the output waveguides 118-125 are coupled separately to output ports 140-147, respectively. Input optical signals are placed on the input waveguides 102-109 by the corresponding input ports 132-139 and transmitted in the direction identified by directional arrow 130. Output optical signals are placed on the output waveguides 110-117 by the switch elements and transmitted in the direction identified by directional arrow 131. The input and output optical signals are data encoded (i.e., amplitude modulated) optical signals. The input and output ports 132-147 can be connected to processors, memory, circuit boards, servers, storage servers, external network connections, other switches, or any other data processing, storing, or transmitting device.

The switch 100 can be operated as a circuit switch. Suppose the switch 100 is directed to transmit data from the input port 137 to the output port 143. An external switch control (not shown) activates the switch element 128. The input port 137 places input optical signals encoding the data onto the input waveguide 107 in the direction 130. The switch element 128 extracts the input optical signals and the lightwaves transmitted along the power waveguide 121 in the direction 129. The switch element 128 then encodes the data encoded in the input optical signals onto the extracted lightwaves by modulating or turning the lightwaves "on" and "off" to produce output optical signals that are transmitted in the direction 131 on the output waveguide 113 to the output port 143.

Optoelectronic network switch embodiments are not limited to the square 8×8 network switch 100. In other embodiments, the number of rows and columns of switch elements can scaled up or down as needed. In generals, embodiments of the present invention include N×N network switches, where N is a positive integer representing the same number of rows and columns of switch elements. In other network switch embodiments, the number of rows can be different from the number of columns. In general, network switches embodiments can be M×N, where M and N are positive integers representing the number of rows and columns of switch elements, respectively.

Figure 2A:
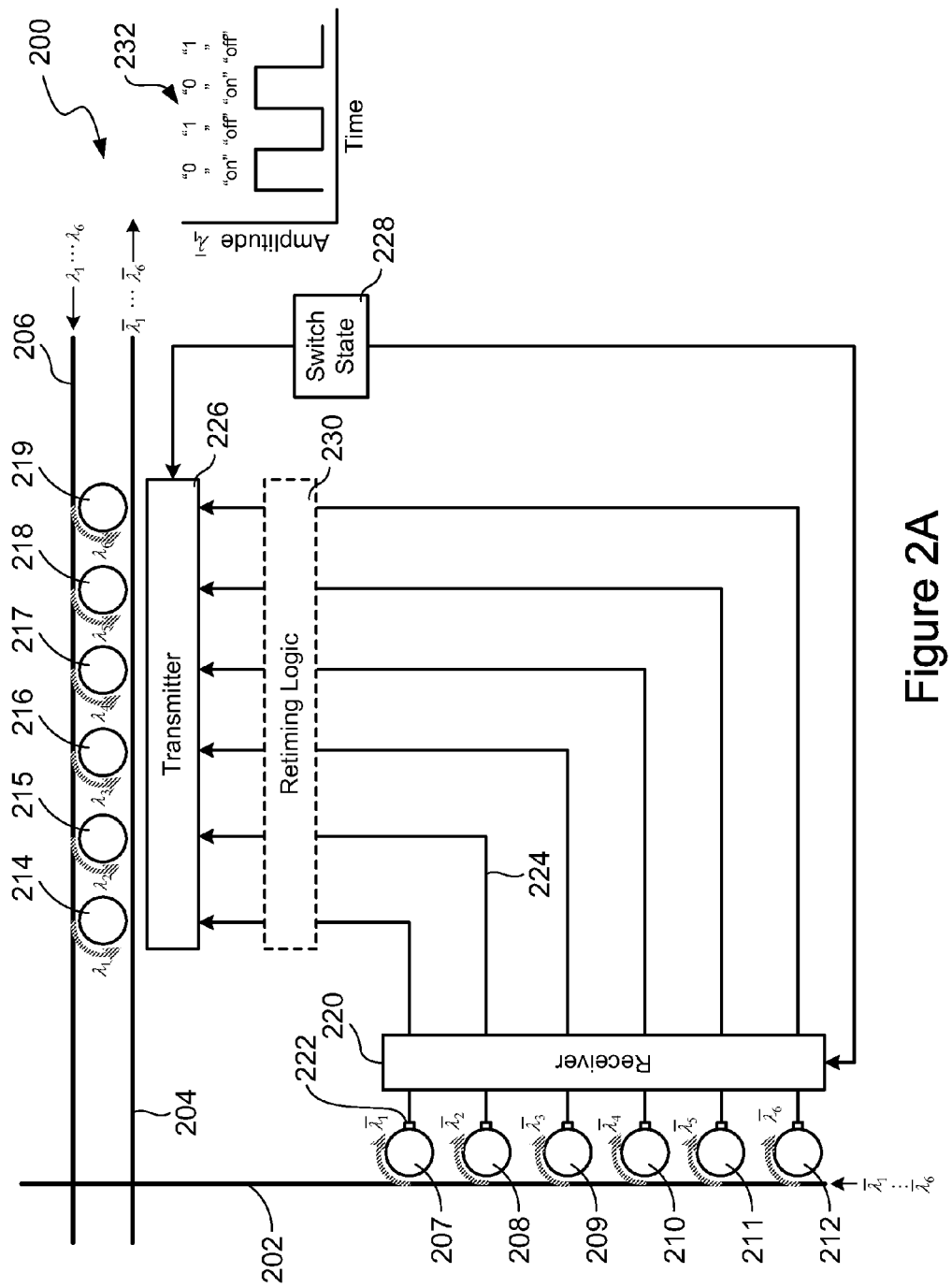
FIG. 2A shows a schematic representation and operation of a first circuit switch element configured in accordance with embodiments of the present invention.

FIG. 2A shows a schematic representation of a first circuit switch element 200 configured in accordance with embodiments of the present invention. The switch element 200 includes an input waveguide 202, an output waveguide 204, and a power waveguide 206. The input waveguide 202 is optically coupled to six input resonators 207-212, and the power waveguide 206 is optically coupled to six output resonators 214-219, which are also optically coupled to the output waveguide 204. The six input resonators 207-212 are optically coupled to detectors that are electronically coupled to a receiver 220. For example, detector 222 is adjacent and optically coupled to the input resonator 207 and is electronically coupled to the receiver 220. The detectors absorb input optical signals trapped in the input resonators 207-212 and generate corresponding data encoded electronic signals that are transmitted to the receiver 220 that transmits the electronic signals to a transmitter 226 via an electronic interconnect. The direct electrical connections are represented by directional arrows, such as directional arrow 224. A switch state controller 228 holds the configuration data for the switch element and determines which input connects to which output.

The input resonators 207-212 and output resonators 214-219 are each electronically tunable and configured to have resonance with a particular wavelength of light propagating along an optically coupled waveguide when an appropriate voltage is applied. In this case, the resonator is said to be turned "on." Each turned "on" resonator extracts via evanescent coupling at least a portion of the light from the waveguide and traps the extracted light within the resonator for a period of time. When the voltage is turned "off," the resonance wavelength of the resonator shifts away from the wavelength of the light, and the light propagates undisturbed along the optically coupled waveguide past the resonator. In this case, the resonator is said to be turned "off." The configuration and operation of the input resonators 207-212 and the output resonators 214-219 are described in greater detail below in the subsections "Microring Resonators and Ridge Waveguides" and "Photonic Crystals and Resonant Cavities."

Operation of the switch element 200 is now described with reference to a particular example. In the following description, a lightwave of a particular wavelength is represented by $\lambda$, and a data encoded input or output optical signal of the same wavelength is represented by $\overline{\lambda}$. In addition, all of the input optical signals are used to carry the data and all of the power signals are used to produce output optical signals encoding the same data. The input resonators 207-212 and the output resonators 214-219 are configured to have resonance with one of six different wavelengths $\lambda_1, \lambda_2, \lambda_3, \lambda_4, \lambda_5$, and $\lambda_6$, respectively, when turned "on." As shown in FIG. 2A, the power waveguide 206 carries the six lightwaves output from an optical power source (not shown). The six resonators 207-212 are turned "on" and evanescently couple six input optical signals $\overline{\lambda}_1, \overline{\lambda}_2, \overline{\lambda}_3, \overline{\lambda}_4, \overline{\lambda}_5$, and $\overline{\lambda}_6$, respectively, from the waveguide 202. The six input optical signals encode data destined for an output port (not shown) connected to the output waveguide 204. Corresponding detectors convert the six input optical signals resonating in the resonators 207-212 into six electronic signals that are sent to the transmitter 226 via direct electrical connections. Retiming logic 230 is used to synchronize the arrival of the electronic signals at the transmitter because input signals may have different phases when they extracted from the input waveguide 202. The transmitter 226 encodes the data in the six lightwaves $\lambda_1, \lambda_2, \lambda_4, \lambda_5$, and $\lambda_6$, to produce six output optical signals $\overline{\lambda}_1, \overline{\lambda}_2, \overline{\lambda}_3, \overline{\lambda}_4, \overline{\lambda}_5$, and $\overline{\lambda}_6$ that are transmitted along the output waveguide 204.

Encoding data in the six lightwaves can be accomplished by turning the output resonators 214-219 "on" and "off" in accordance with the "0" and "1" bits of the electronic signals transmitted to the resonators 214-219. For example, when the output resonator 214 is turned "on" for the time period corresponding to the bit "0," the output resonator 214 evanescently couples at least a portion of the lightwaves $\lambda_1$ from the power waveguide 206 into the output waveguide 204. When the output resonator 214 is turned "off" for the time period corresponding to the bit "1," the lightwaves $\lambda_1$ passes the output resonator 214 undisturbed. The result 232 is an amplitude modulated or "on" and "off" output optical signal $\overline{\lambda}_1$ encoding the data carried by the input optical signal.

Note that in certain embodiments, the wavelengths of the input optical signals can correspond to the wavelengths of the output optical signals, while in other embodiments, the wavelengths of the input optical signals do not have to correspond to the wavelengths of the output optical signals. For example, in certain embodiments, the data carried by the input optical signal $\overline{\lambda}_2$ can be encoded on the lightwave $\lambda_2$ to produce the output signal $\overline{\lambda}_2$ carrying the same data, while in other embodiments, the input optical signal can be encoded on the lightwave $\lambda_4$ to produce the output signal $\overline{\lambda}_4$ carrying the same data.

Figure 2B:
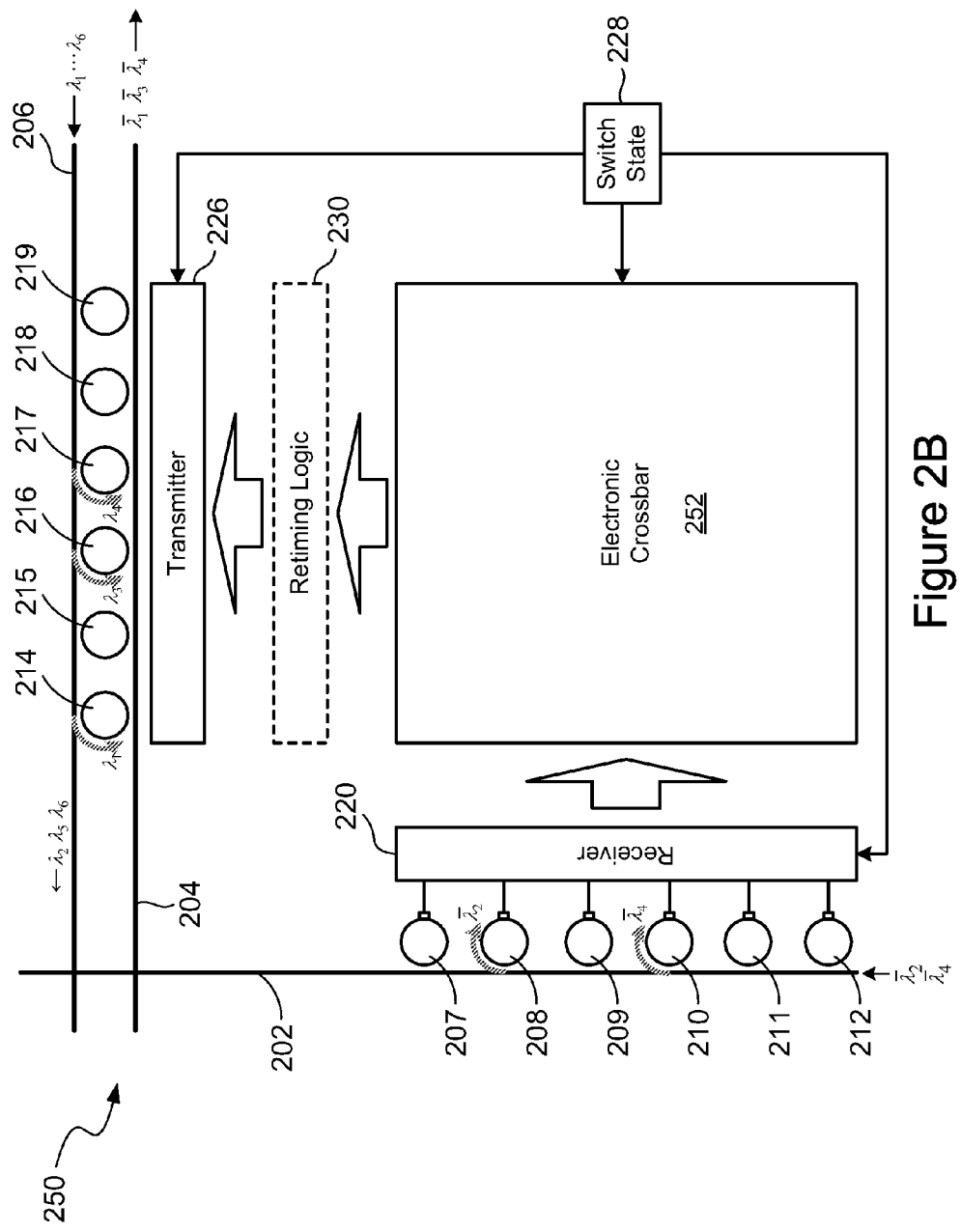
FIG. 2B shows a schematic representation and operation of a second circuit switch element configured in accordance with embodiments of the present invention.

FIG. 2B shows a schematic representation of a second circuit switch element 250 configured in accordance with embodiments of the present invention. The switch element 250 is nearly identical to the switch element 200 except the switch element 250 includes an electronic crossbar 252 that is electronically coupled to the receiver 220 and the transmitter 226. The electronic crossbar 252 is controlled by switch state controller 228 to route the electronic signals output from the receiver 220 to the transmitter 226.

The switch element 250 can be used to route the electrical signals produced by data encoded on all six input optical signals to produce data encoded on all six output signals as described above with reference to FIG. 2A. In other embodiments, rather than receiving data on all six input optical signals and using all out optical signals, the switch element 250 can be used to receive data encoded on a certain number of input optical signals and output data on a different number of output optical signals. For example, an input port (not shown) places the input optical signals $\overline{\lambda}_2$ and $\lambda_4$ onto the input waveguide 202. The two input optical signals $\overline{\lambda}_2$ and $\overline{\lambda}_4$ are encoded with data intended for the output port (not shown) coupled to the output waveguide 204. As shown in FIG. 2B, when the resonators 208 and 210 are turned "on," the input optical signals $\overline{\lambda}_2$ and $\overline{\lambda}_4$ are evanescently coupled from the input waveguide 202. Corresponding detectors convert the input optical signals $\overline{\lambda}_2$ and $\overline{\lambda}_4$ into electronic signals encoding the same data and transmit the electronic signals to the receiver 220. The electronic crossbar 224 receives the electronic signals from the receiver 220 and reroutes the electronic signals to the transmitter 226. Because the input optical signal transmission times may not be synchronized, the switch element 200 may include retiming logic 230 to synchronize the transmission of the electronic signals to the transmitter 226. The transmitter 226 encodes the data in the three lightwaves $\lambda_1$, $\lambda_3$, and $\lambda_4$ to produce output optical signals $\bar{\lambda}_1$, $\bar{\lambda}_3$, and $\bar{\lambda}_4$ that are transmitted along the output waveguide 204.

Note that the direct electronic interconnect of the switch element 200 and the electronic crossbar of the switch element 250 are just two of many different kinds of electrical interconnects that can be used to transmit electrical signals from the receiver 220 to the transmitter 226.

In general, switch element embodiments can be configured to receive data on any number of input optical signals and output the data on any number of output optical signals. Unlike the example described above with reference to FIG. 2, in certain embodiments, the resonators of a switch element can be configured to receive input optical signals having one set of wavelengths and produce output optical signals having a different set of wavelengths. In addition, switch embodiments are not limited to six input and six output resonators. In other embodiments, any suitable number of input and output resonators can be used, and the number of input resonators can be different from the number of output resonators.

Figure 3A:
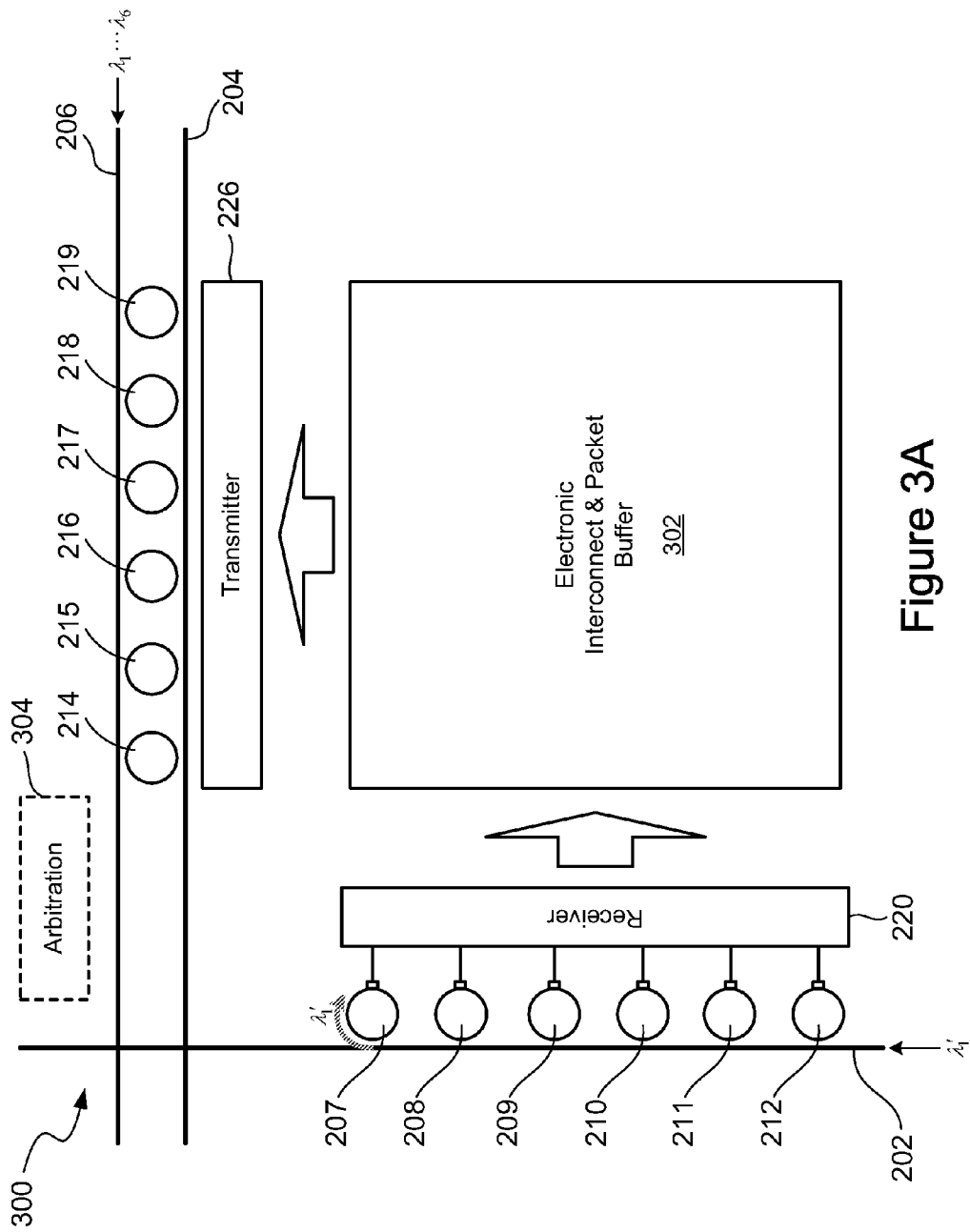
FIGS. 3A-3B shows a schematic representation and operation of a packet switch element configured in accordance with embodiments of the present invention.
Figure 3B:
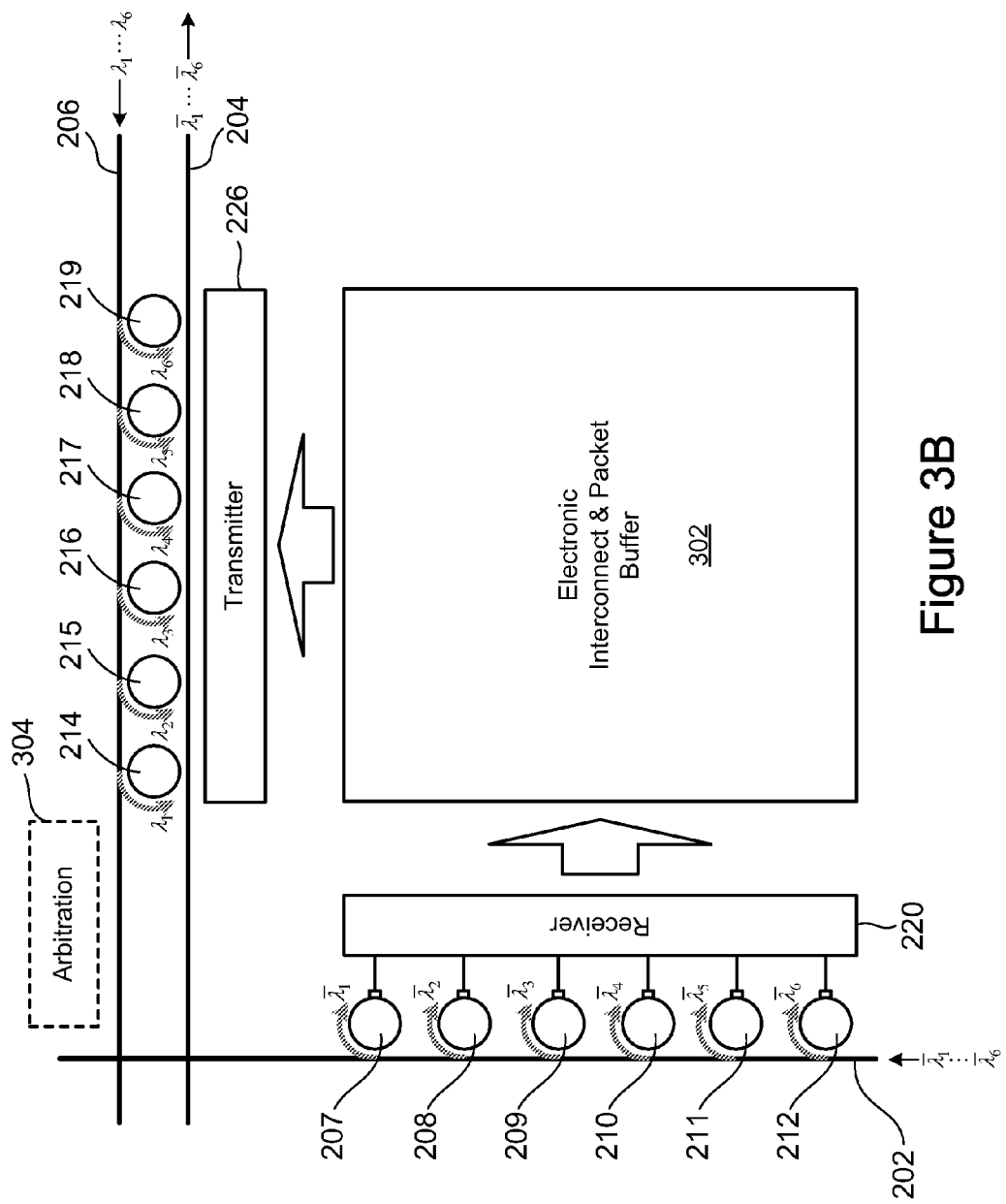

The switch 100 can also be operated as a data packet switch by configuring each switch element with a data packet buffer. Arbitration can be used to select which of multiple input packets is transmitted to a particular output port. FIGS. 3A-3B shows a schematic representation of a packet switch element 300 configured to transmit data packets in accordance with embodiments of the present invention. The switch element 300 is nearly identical to the switch element 250 except the electronic interconnect 252 is replaced by a combined electronic interconnect and packet buffer 302. The packet buffer can be additional memory space reserved for storing a packet awaiting transmission to an output port. In the first phase, as shown in FIG. 3A, the switch element is directed by arbitration 304 to turn "on" the resonator 207. The optical signal $\lambda_1'$ is evanescently coupled from the input waveguide 202 into the microring 207, and the switch element 300 prepares to receive input optical signals by turning "on" the remaining resonators 208-212. In the second phase, as shown in FIG. 3B, the input optical signals $\bar{\lambda}_1$, $\bar{\lambda}_2$, $\bar{\lambda}_3$, $\bar{\lambda}_4$, $\bar{\lambda}_5$, and $\bar{\lambda}_6$ are evanescently coupled into the resonators 207-212, and the switch element 300 outputs the same data packet in the output optical signals $\bar{\lambda}_1$, $\bar{\lambda}_2$, $\bar{\lambda}_3$, $\bar{\lambda}_4$, $\bar{\lambda}_5$, and $\bar{\lambda}_6$, as described above with reference to FIG. 2A. In other embodiments, the data packet can be sent on using certain input optical signals and output on different or the same output optical signals as described above with reference to FIG. 2B.

In certain embodiments, when the output port is not busy, the packet may be immediately routed to the output port in a technique called "cut-through." Alternatively, when the output port is in use by another input port, the packet is stored in the packet buffer, and transmitted when the output port becomes available. The arbitration 304 is used to select between any of the possible switch elements requesting the packet.

Returning to FIG. 1, in certain switch embodiments, in order to reduce optical power consumption, data can be sent in two phases. In the first phase, each of the switch elements turns "on" a different resonator and waits to receive the corresponding optical signal within a first time interval. The switch elements all receive the same optical signal identifying the output port. However, the optical signal has resonance with a particular resonator of the switch element coupled to the selected output port. This switch element responds by preparing to receive the data encoded in a number of input optical signals during the second phase. Because the remaining switch elements did not turn "on" the resonators matching the resonance of the optical signal, these switch elements do not receive the optical signal during the first time interval and respond by turning "off" their resonators and wait for the data to be transmitted during the second phase. For example, initially, the eight different switch elements 150-157 each turn "on" a different resonator. The resonators can each correspond to one of eight different optical signals having wavelengths $\lambda_1$, $\lambda_2$, $\lambda_3$, $\lambda_4$, $\lambda_5$, $\lambda_6$, $\lambda_7$, and $\lambda_8$. Suppose the input port 136 is to transmit a data to the output port 145. The input port 136 outputs a single optical signal, such as a pulse, of the wavelength having resonance with the resonator turned "on" by the switch element 155. Upon receiving the optical signal, the switch element 155 responds by turning "on" its corresponding resonators and waits to receive input optical signals from the input port 136, while the remaining switch elements 150-154, 156, and 157 turn "off" their corresponding input resonators. In the second phase, the input port 136 transmits the input optical signals, which are received by the switch element 155 and transmitted to the output port 145.

In other switch embodiments, a single address optical signal can be used to activate the switch element coupled to the selected output port. For example, in the first phase, the output ports 140-147 can each be assigned a different address. All of the switch elements 150-157 can turn "on" the resonator having resonance with the wavelength of the address optical signal and wait to receive the address optical signal. The input port transmits the address of the output port 145 on the waveguide 106 in the address optical signal. The switch element 155 receives the address optical signal and prepares to receive input optical signals. The remaining switch elements 150-154, 156, and 157 also receive the address optical signal, but because the address does not match the address of their optically coupled output ports, the remaining switch elements 150-154, 156, and 157 respond by turning "off" their input resonators. In the second phase, the input port 136 transmits the input optical signals, which are received by the switch element 155 and transmitted to the output port 145.

Optoelectronic network switch embodiments are not limited to employing a single switch element at each input and output waveguide crossing point. A hierarchical scheme in which short distance switching and communication is performed electronically can be applied to reduce the number of resonators, receivers, and transmitters while maintaining the same number of input and output waveguides.

Figure 4:
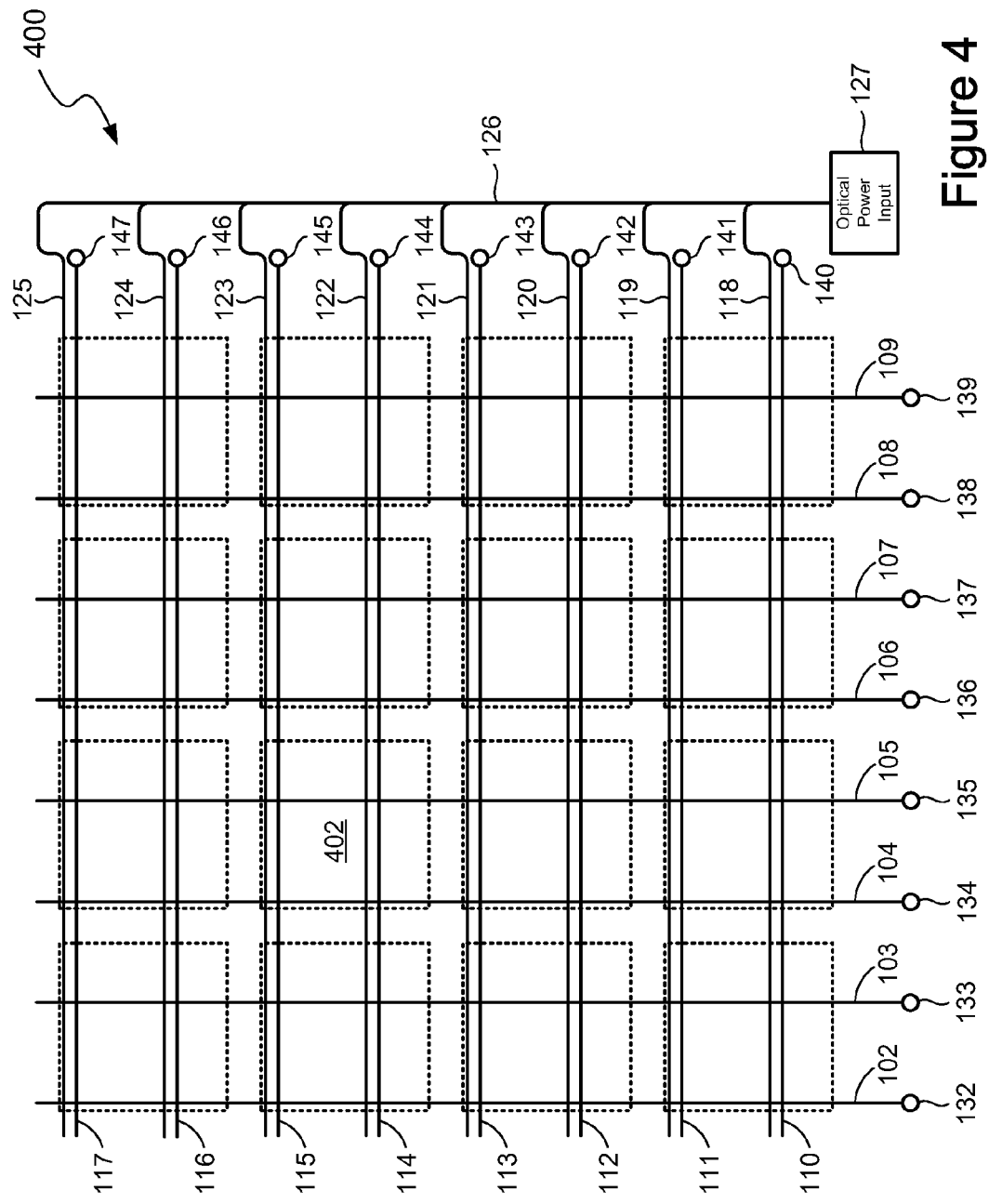
FIG. 4 shows a schematic representation of a second optoelectronic network switch configured in accordance with embodiments of the present invention.

FIG. 4 shows a schematic representation of a second optoelectronic network switch 400 configured in accordance with embodiments of the present invention. The switch 400 includes the same waveguides 102-126, optical power source 127, and ports 132-147 as the switch 100 described above with reference to FIG. 1. Like the switch 100, the switch elements of the switch 400 also switch input optical signals received on the input waveguides 102-109 into output optical signals carried by the output waveguides 110-117. However, rather than employing a single switch element to perform switching of input optical signals carried by one input waveguides into output optical signals carried by an output waveguide, the switch 400 employs 2×2 switch elements to switch input optical signals carried by one of two input waveguides into output optical signals that can be carried by one of two output waveguides. For example, the 2×2 switch element 402 can receive input optical signals on the input waveguide 104 or the input waveguide 105 and place corresponding output optical signals on the output waveguide 114 or the output waveguide 115.

Figure 5:
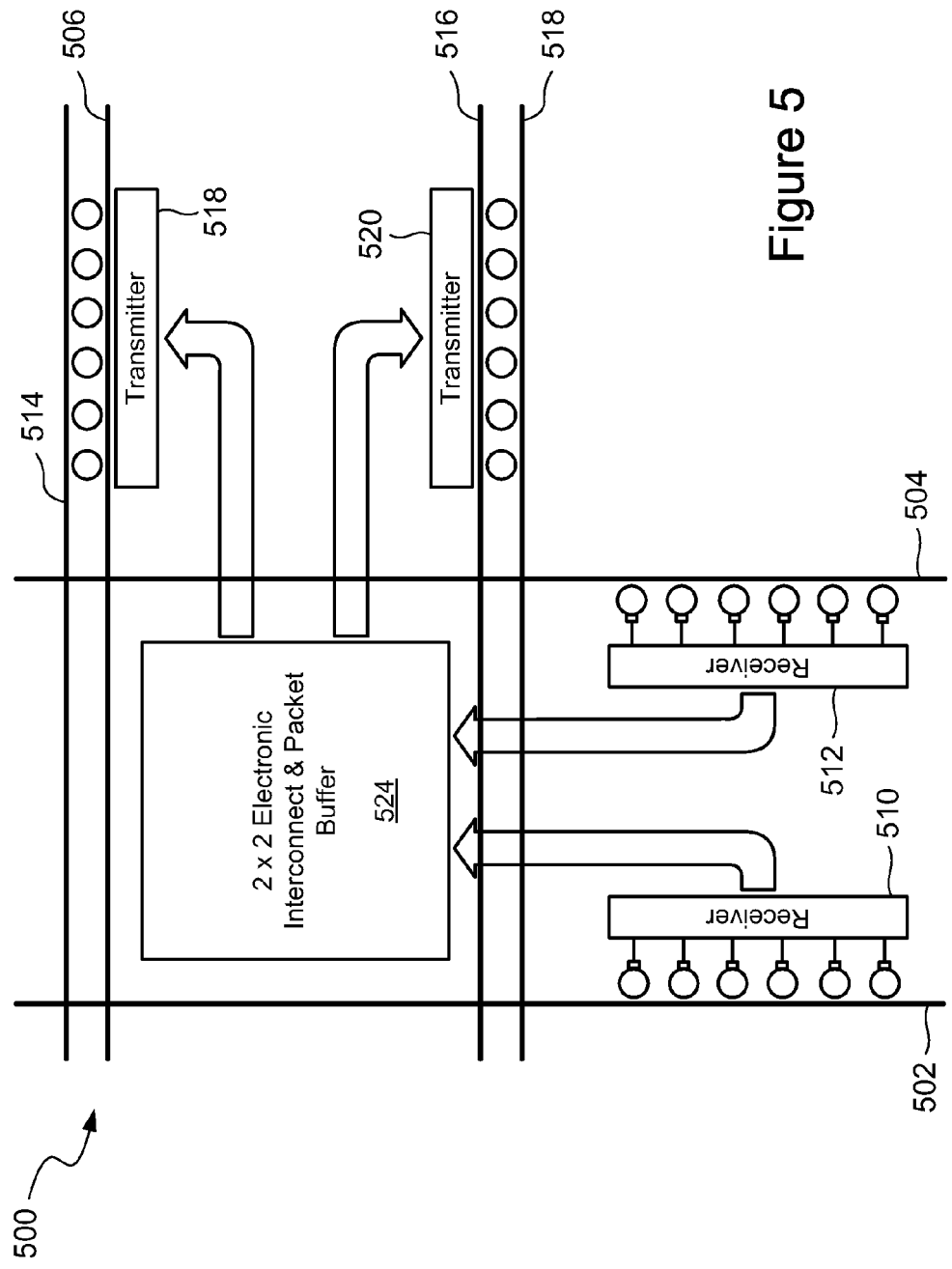
FIG. 5 shows a schematic representation of a 2×2 packet switch element configured in accordance with embodiments of the present invention.

FIG. 5 shows a schematic representation of a 2×2 packet switch element 500 configured in accordance with embodiments of the present invention. The switch element 500 includes two input waveguides 502 and 504 and two output waveguides 506 and 508. The input waveguides 502 and 504 are each optically coupled to a set of six resonators that are electronically coupled to receivers 510 and 512, respectively. Output waveguides 506 and 508 are also each optically coupled to a set of six resonators that are optically coupled to power waveguides 514 and 516, respectively, and are electronically coupled to transmitters 518 and 520, respectively. The resonators are operated as described above with reference to FIG. 2. The switch element 500 includes a 2×2 electronic interconnect and packet buffer 524 that receives electronic packets from the receivers 510 and 512, stores the data packets in the packet buffer, and transmits the packets to either the transmitter 518 or the transmitter 520. The packets are encoded in lightwaves by the transmitters 518 and 520 as described above with reference to FIG. 2. In other embodiments, the 2×2 packet switch element 500 can be modified for circuit switches by eliminating the packet buffer and including retiming logic between each of the transmitters 518 and 520 and the 2×2 electronic interconnect and packet buffer 524, and switch configuration state, as described above with reference to FIG. 2.

Figure 6:
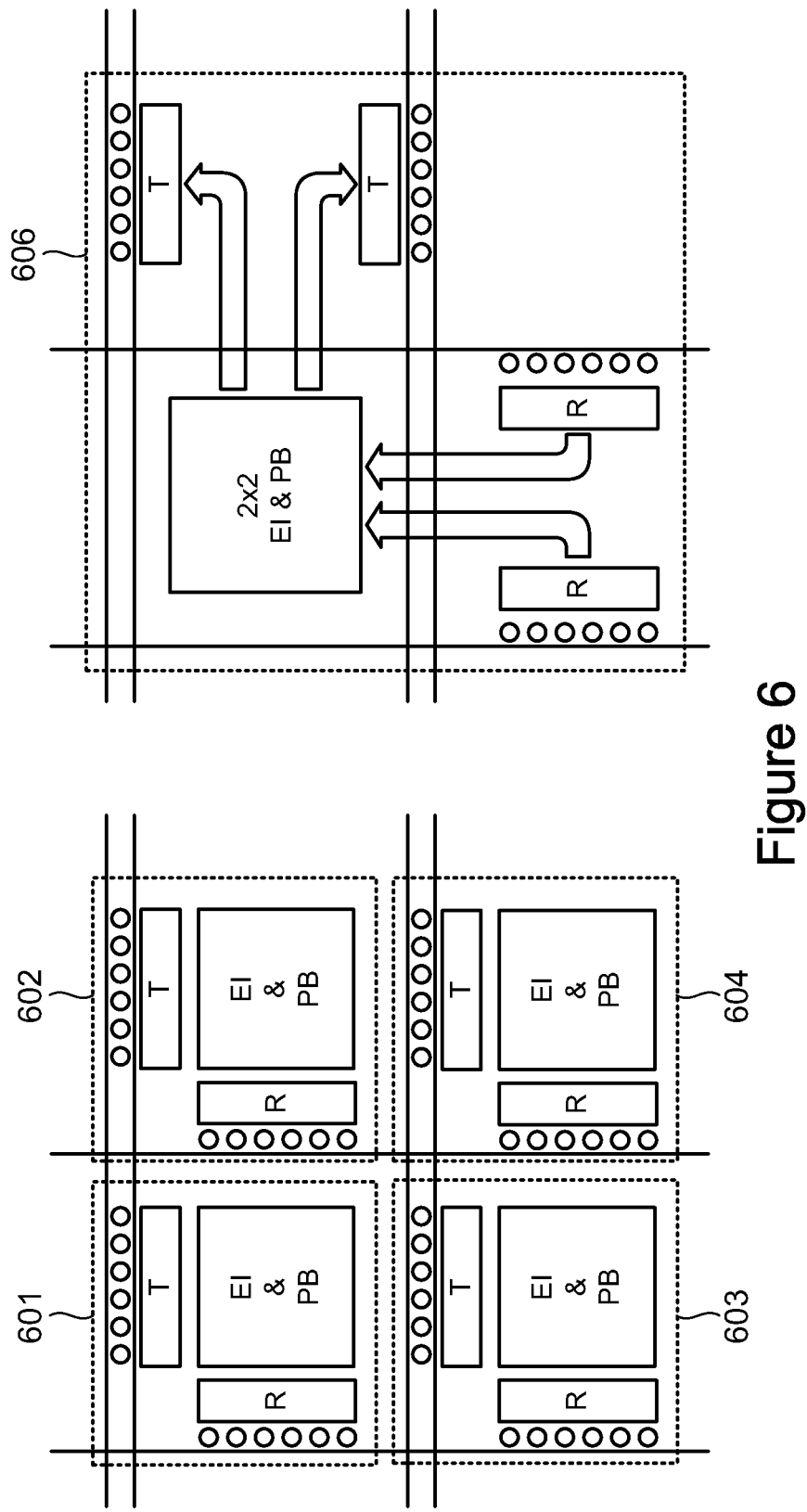
FIG. 6 shows four 1×1 switch elements and a single 2×2 switch element in accordance with embodiments of the present invention.

FIG. 6 shows four 1×1 switch elements 601-604 and a single 2×2 switch element 606 in accordance with embodiments of the present invention. The four 1×1 switch elements 601-604 schematically represent four adjacent packet switch elements 300 described above with reference to FIG. 3. Note that each of the 1×1 switch elements 601-604 includes corresponding sets of input and output resonators, a receiver, a transmitter, and an electronic interconnect and packet buffer which totals four receivers, four transmitter, four electronic interconnects, and a total of 48 resonators. In contrast, FIG. 6 also reveals a single 2×2 switch element 606 that schematically represents either a 2×2 circuit switch element or the 2×2 packet switch element 500 The single 2×2 switch element 606 can perform the same switching operation carried out by the four 1×1 switch elements 601-604 but with half as many resonators, receivers, and transmitters.

Switch element embodiments of the present invention are not limited to the 2×2 switch elements described above. In practice, the size of the switch element is determined by the crossover point in efficiency between optical and electronic intrachip communication. In other embodiments, switch elements can be scaled up to include 3×3, 4×4, 5×5 or large switch elements. In general, an M×N network switch has M×N receivers and M×N transmitters, and in the case of packet network switches, each arbiter needs to multiplex M inputs. By replacing an M×N network switch with a P×Q network switch for the same number of input and output waveguides, where M>P and N>Q such that P divides M and Q divides N, the number of receivers is reduced to N/Q and each output arbiter needs only to multiplex between M/P inputs. The total N×M network switch uses N×M/P receivers and M×N/Q transmitters. In the packet network switch, the use of a single electronic interconnect also permits sharing of buffer resources with the electronic interconnect reducing the M×N buffer requirement of the M×N network switch.

Figure 7A:
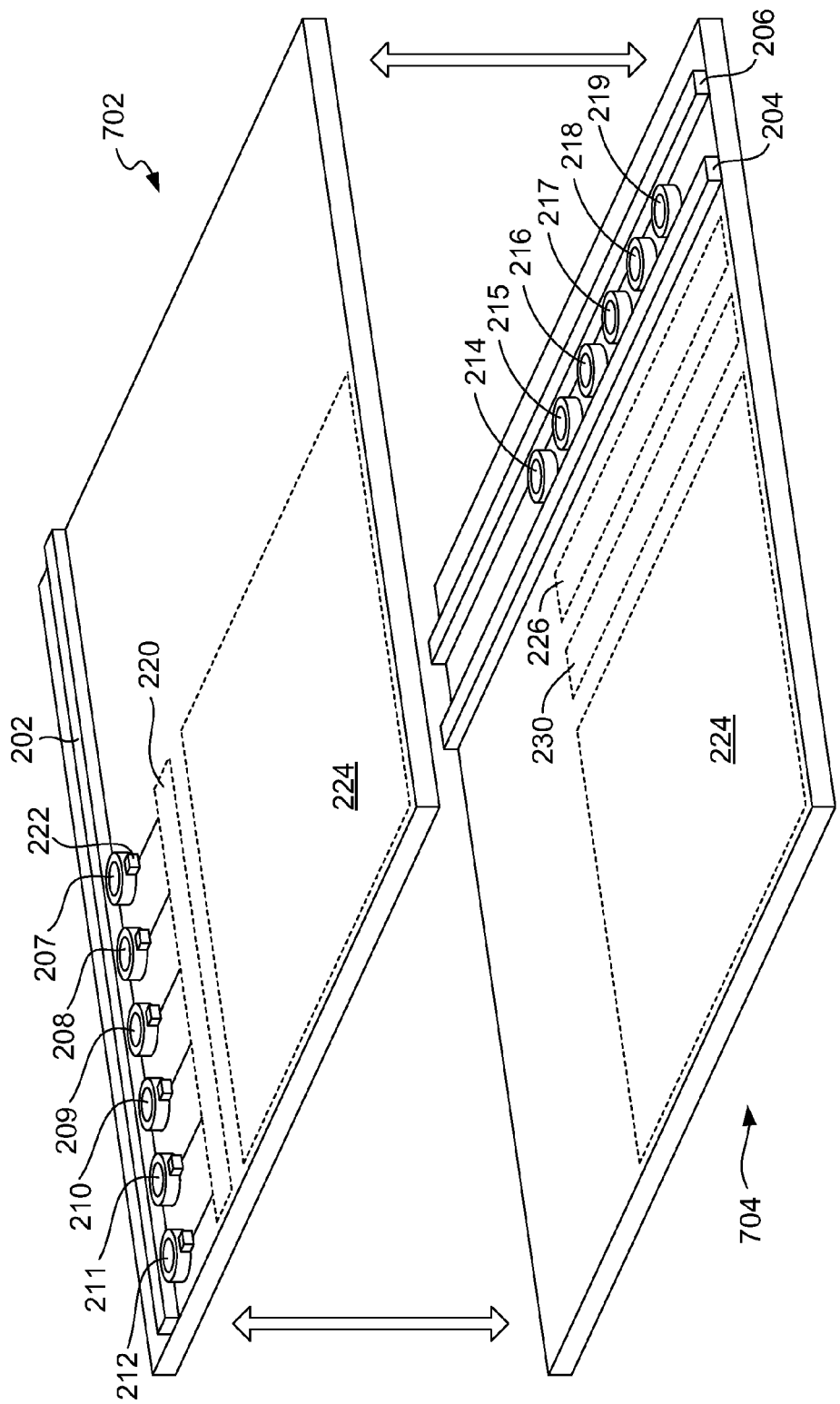
FIG. 7A shows an exploded isometric view of a switch element formed in two separate optical layers in accordance with embodiments of the present invention.
Figure 7B:
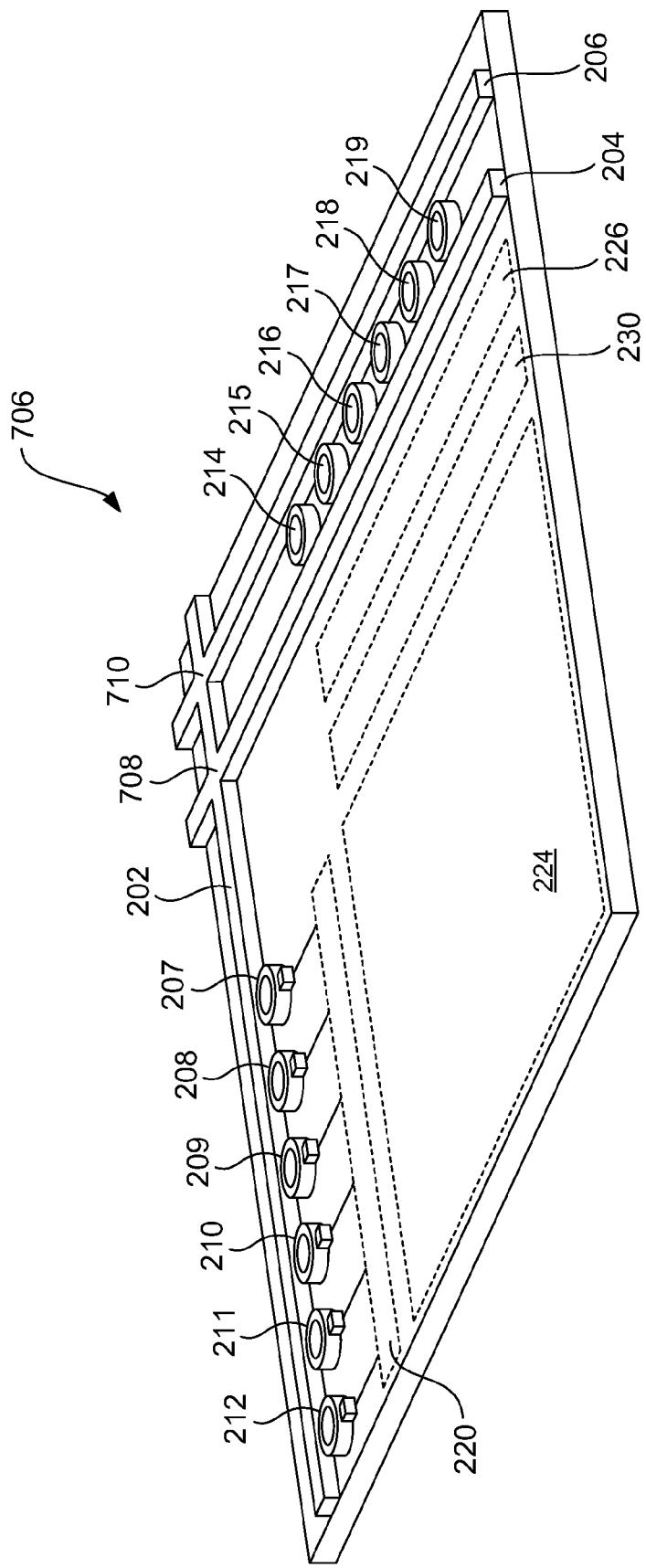
FIG. 7B shows an isometric view of a switch element formed in a single optical layer in accordance with embodiments of the present invention.

In certain optoelectronic network switch embodiments, the set of input waveguides and the set of output waveguides can be fabricated in two separate optical layers. FIG. 7A shows an exploded isometric view of the switch element 200 formed in two separate optical layers in accordance with embodiments of the present invention. The input waveguide 202 and optically coupled resonators 207-212 are implemented in a first optical layer 702, and the output waveguide 204, the power waveguide 206, and the output resonators 214-219 are implemented in a second optical layer 704. As shown in FIG. 7A, the input, output, and power waveguides 202, 204, and 206 are implemented using ridge waveguides, and the input resonators 207-212 and the output resonators 214-219 are implemented using microring resonators described in greater detail below. In other embodiments, the set of input waveguides and the set of output waveguides can be implemented in a single optical layer. FIG. 7B shows an isometric view of the switch element 200 formed in a single optical layer 706 in accordance with embodiments of the present invention. Little crosstalk occurs at the intersections 708 and 710 between the input waveguide 202 and the output and power waveguides 204 and 206, respectively.

The switch embodiments of the present invention are capable of scaling to greater bandwidths and switch sizes than purely electronic switches through the use of integrated optical IO structures for inter-chip communication. These consume less power than equivalent electronic IOs operating at the same data rate. The use of hierarchical internal structures, using arrays of smaller electronic switches connected by optical on-chip interconnects, avoids the need for lengthy, on-chip, electronic interconnections, while optimizing the use of optical to electronic and electronic to optical converters. When compared to purely optical switches, the optoelectronic network switches of the present invention are more flexible due to the ability to implement packet switching and buffering, which is a requirement for many general purpose computing applications.

Microring Resonators and Ridge Waveguides

Figure 8A:
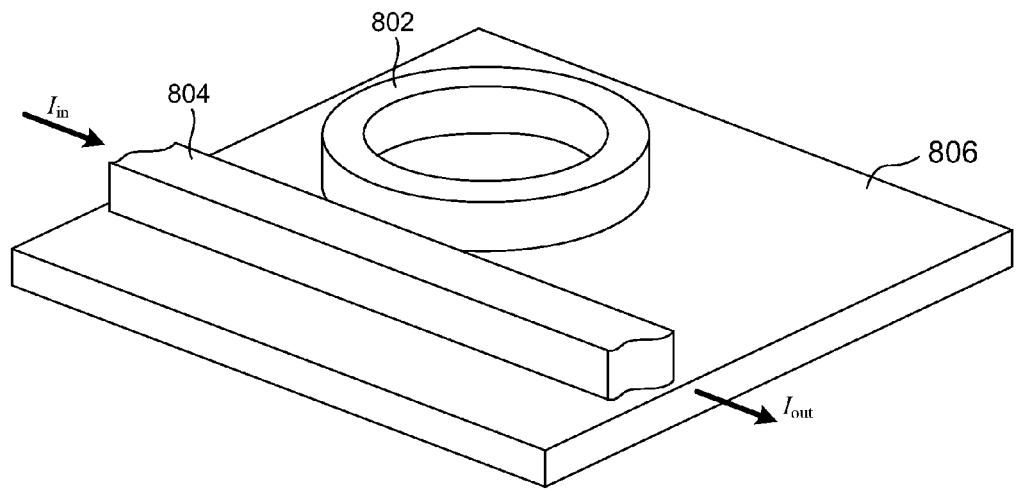
FIG. 8A shows an isometric view of a microring resonator and a portion of an adjacent ridge waveguide configured in accordance with embodiments of the present invention.

In certain system embodiments, the waveguides 202, 204, and 206 can be ridge waveguides, and the resonators can be microring resonators. FIG. 8A shows an isometric view of a microring resonator 802 and a portion of an adjacent ridge waveguide 804 disposed on the surface of a substrate 806 and configured in accordance with embodiments of the present invention. Optical signals transmitted along the waveguide 804 are evanescently coupled from the waveguide 804 into the microring 802 when the optical signals satisfy the resonance condition:

$$n_{\mathit{eff}} C = M\lambda$$

where $n_{\mathit{eff}}$ is the effective refractive index of the microring 802, C is the circumference of the microring 802, m is an integer, and $\lambda$ is the wavelength of an optical signal. In other words, optical signals with wavelengths that are integer multiples of the wavelength $\lambda$ are evanescently coupled from the waveguide 804 into the microring 802.

Figure 8B:
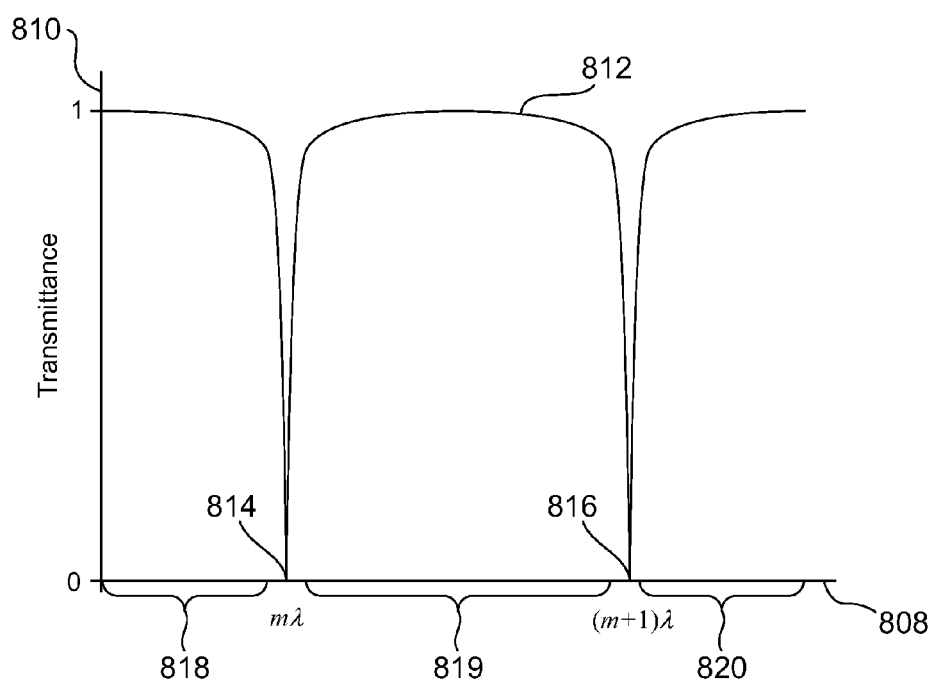
FIG. 8B shows a plot of transmittance versus wavelength for a microring in accordance with embodiments of the present invention.

FIG. 8B shows a plot of transmittance versus wavelength for the microring 802 and the waveguide 804 shown in FIG. 8A. Horizontal line 808 represents a wavelength axis, vertical line 810 represents a transmittance axis, and curve 812 represents the transmittance of optical signals passing the microring 802 over a range of wavelengths. The transmittance of an optical signal passing the microring 802 is defined by:

$$T = \frac{I_{out}}{I_{in}}$$

where $I_{in}$ is the intensity of the optical signal propagating along the waveguide 804 prior to reaching the microring 802, and $I_{out}$ is the intensity of the optical signal propagating along the waveguide 804 after passing the microring 802. Minima 814 and 816 of the transmittance curve 812 correspond to zero transmittance for optical signals having wavelengths m$\lambda$ and (m+1)$\lambda$ and represent only two of many regularly spaced minima. These optical signals satisfy the resonance condition above, are said to have a "strong resonance" with the microring 802, and are evanescently coupled from the waveguide 804 into the microring 802. In the narrow wavelength regions surrounding the wavelengths m$\lambda$ and (m+1)$\lambda$, the transmittance curve 812 reveals a steep increase in the transmittance the farther the wavelength of an optical signal is away from the wavelengths m$\lambda$ and (m+1)$\lambda$. In other words, the strength of the resonance decreases, and the portion of the optical signal coupled from the waveguide 804 into the microring 802 decreases the farther an optical signal's wavelength is away from an integer multiple wavelength of $\lambda$. Optical signals with wavelengths in the regions 818-820 pass the microring 802 substantially undisturbed.

Figure 9A:
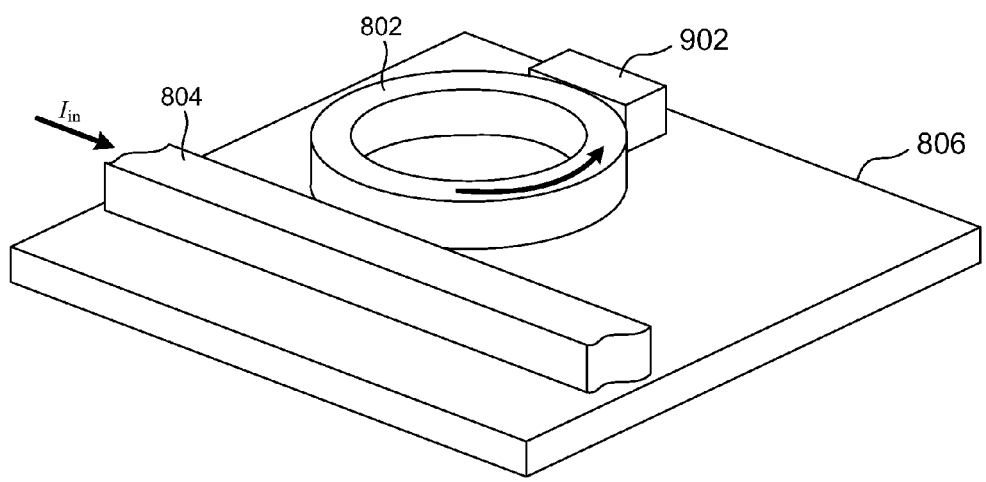
FIG. 9A shows the microring resonator used as a photodetector in accordance with embodiments of the present invention.
Figure 9B:
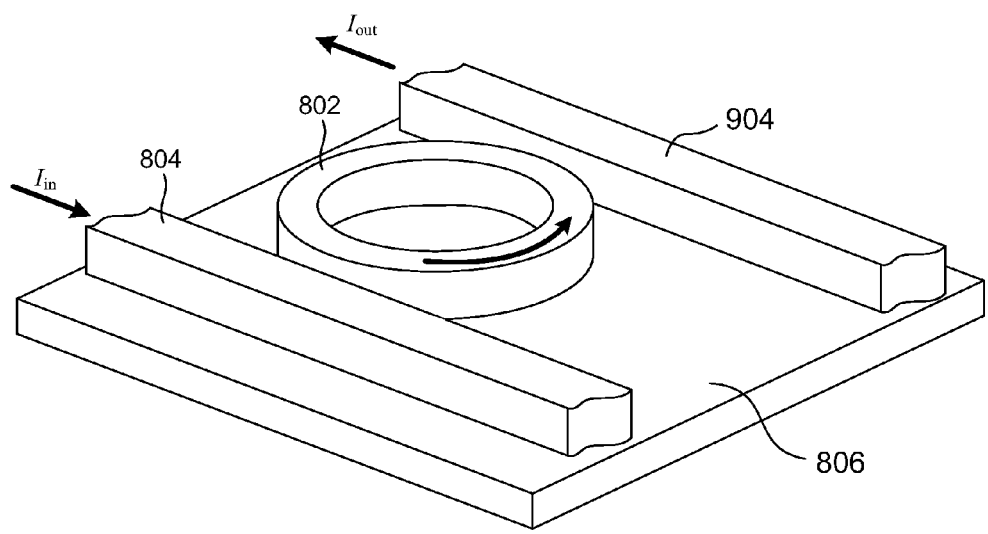
FIG. 9B shows the microring resonator used to couple an optical signal from a first waveguide into a second waveguide in accordance with embodiments of the present invention.

Because of the evanescent coupling properties of microring resonators, microring resonators can be used to detect particular optical signals transmitting along an adjacent waveguide, or microring resonators can be used to couple optical signals of a particular wavelength from one adjacent waveguide into another adjacent waveguide. FIG. 9A shows the microring resonator 802 used as a photodetector in accordance with embodiments of the present invention. An optical signal having a wavelength that is resonant with the microring 802 is evanescently coupled from the waveguide 804 into the microring 802 and remains trapped for a period of time while circulating within the waveguide 802. A detector 902 is disposed on the surface of the substrate 806 adjacent to the microring 802. The detector 902 absorbs the optical signal circulating in the microring 802 and converts the optical signal into an electronic signal that can be transmitted over signal lines to electronic devices. The detector 902 can be comprised of germanium ("Ge") or any other suitable light absorbing element or compound. FIG. 9B shows the microring resonator 802 used to couple an optical signal from the waveguide 804 into a second waveguide 904 in accordance with embodiments of the present invention. An optical signal having a wavelength that is resonant with the microring 802 is evanescently coupled from the waveguide 804 into the microring 802. The optical signal circulates with the microring 802 and is evanescently coupled into the waveguide 904. Note that the optical signal is transmitted along the waveguide 804 in one direction and the optical signal coupled into the second waveguide 904 is transmitted in the opposite direction.

Figure 10:
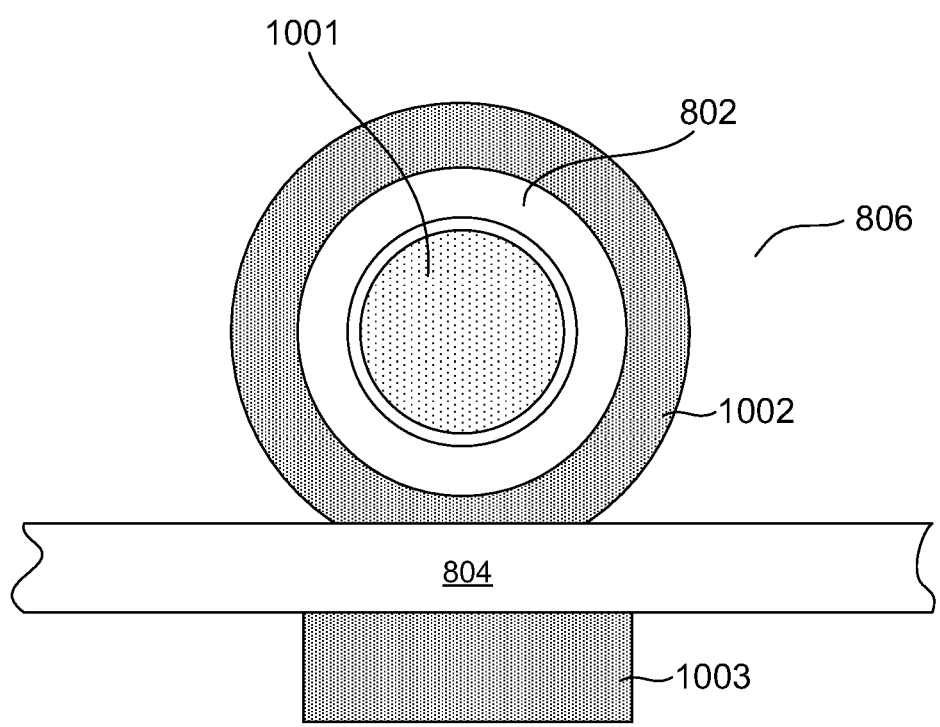
FIG. 10 shows a schematic representation and top view of doped regions surrounding a microring and ridge waveguide in accordance with embodiments of the present invention.

The microring 802 can be electronically tuned by doping regions of the substrate 806 surrounding the microring 802 and waveguide 804 with appropriate electron donor and electron acceptor atoms or impurities. FIG. 10 shows a schematic representation and top view of doped regions surrounding the microring 802 and the ridge waveguide 804 in accordance with embodiments of the present invention. In certain embodiments, the microring 802 comprises an intrinsic semiconductor. A p-type semiconductor region 1001 can be formed in the semiconductor substrate interior of the microring 802, and n-type semiconductor regions 802 and 803 can be formed in the semiconductor substrate 806 surrounding the outside of the microring 802 and on the opposite side of the waveguide 804. The p-type region 1001 and the n-type regions 1002 and 1003 form a p-i-n junction around the microring 802. In other embodiments, the dopants can be reversed in order to form an n-type semiconductor region 1001 in substrate interior of the microring 802 and p-type semiconductor regions 1002 and 1003 in the substrate surrounding the outside of the microring 802.

The electronically tunable microring 802 can be configured to evanescently couple or divert light from an adjacent waveguide when an appropriate voltage is applied to the region surrounding the microring. For example, the electronic controlled microring 802 can be configured with a circumference C and an effective refractive index $n_{\textit{eff}}$ such that an optical signal with a wavelength $\lambda$ propagating along the waveguide 804 does not satisfy the resonance condition as follows:

$$n'_{\textit{eff}} C \neq m\lambda$$

This optical signal passes the microring 802 undisturbed and the microring 802 is said to be turned "off." On the other hand, the microring 802 can be formed with suitable materials so that when an appropriate voltage is applied to the microring 802, the effective refractive index $n_{\textit{eff}}'$ shifts to the refractive value $n_{\textit{eff}}$ and the optical signal satisfies the resonance condition:

$$n_{\textit{eff}} C = m\lambda$$

The optical signal is now coupled from the waveguide 804 into the microring 802 and the microring 802 is said to be turned "on." When the voltage is subsequently turned "off," the effective refractive index of the microring 802 shifts back to $n_{\textit{eff}}'$ and the same optical signal propagates along the waveguide 804 undisturbed.

Photonic Crystals and Resonant Cavities

In certain system embodiments, the optoelectronic network switch can be implemented using two-dimensional photonic crystals where the waveguides are photonic crystal waveguides and the resonators are resonant cavities. Photonic crystals are photonic devices comprised of two or more different materials with dielectric properties that, when combined together in a regular pattern, can modify the propagation characteristics of optical signals. Two-dimensional photonic crystals can be comprised of a regular lattice of cylindrical holes fabricated in a dielectric or semiconductor slab. The cylindrical holes can be air holes or holes filled with a dielectric material that is different from the dielectric material of the slab. Two-dimensional photonic crystals can be designed to reflect optical signals within a specified frequency band. As a result, a two-dimensional photonic crystal can be designed and fabricated as a frequency-band stop filter to prevent the propagation of optical signals having frequencies within the photonic bandgap of the photonic crystal. Generally, the size and relative spacing of cylindrical holes control which wavelengths of optical signals are prohibited from propagating in the two-dimensional photonic crystal. However, defects can be introduced into the lattice of cylindrical holes to produce particular localized components. In particular, a resonant cavity, also referred to as a "point defect," can be fabricated to produce a resonator that temporarily traps a narrow wavelength range of optical signals. A waveguide, also referred to as a "line defect," can be fabricated to transmit optical signals with wavelengths that lie within a wavelength range of a photonic bandgap.

Figure 11:
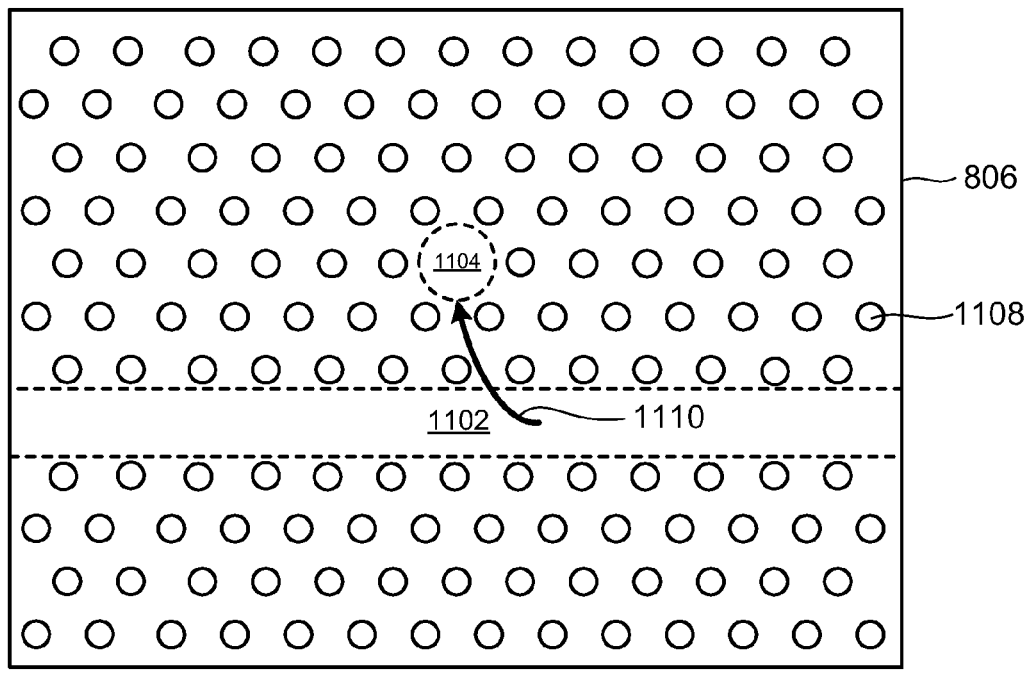
FIG. 11 shows a top view of a photonic crystal with a waveguide and a resonant cavity configured in accordance with embodiments of the present invention.

FIG. 11 shows a top view of a photonic crystal waveguide 1102, a resonant cavity 1104 formed in a slab 1106 in accordance with embodiments of the present invention. Circles, such as circle 1108, represent holes that span the height of the slab 1106. A resonant cavity can be created by omitting, increasing, or decreasing the size of a select cylindrical hole. In particular, the resonant cavity 1104 is created by omitting a cylindrical hole. Photonic crystal waveguides are optical transmission paths that can be used to direct optical signals within a particular wavelength range of the photonic crystal bandgap. Waveguides can be fabricated by changing the diameter of certain cylindrical holes within a column or row of cylindrical holes, or by omitting rows or columns of cylindrical holes. The waveguide 1102 is created by omitting an entire row of cylindrical holes. The holes surrounding the resonant cavity 1104 and the waveguide 1102 form a two-dimensional Bragg mirror that temporarily traps optical signals in the frequency range of the photonic crystal bandgap. Networks of branching waveguides can be used to direct optical signals in numerous different pathways through the photonic crystal. The diameter of an electromagnetic signal propagating along a waveguide can be as small as λ/3n, where n is the refractive index of the slab, while a harmonic mode volume of a resonant cavity can be as small as 2λ/3n.

Waveguides and resonant cavities may be less than 100% effective in preventing optical signals from escaping into the area immediately surrounding the waveguides and resonant cavities. For example, optical signals within a frequency range in the photonic bandgap propagating along a waveguide also tend to diffuse into the region surrounding the waveguide. Optical signals entering the area surrounding the waveguide 1102 or the resonant cavity 1104 experience an exponential decay in amplitude in a process called "evanescence." As a result, the resonant cavity 1102 is located within a short distance of the waveguide 1102 to allow certain wavelengths of optical signals carried by the waveguide 1104 to be evanescently coupled, as represented by directional arrow 1110, from the waveguide 1102 into the resonant cavity 1104. Depending on a resonant cavity 1104 Q factor, an extracted optical signal can remain trapped in the resonant cavity 1104 and resonate for a while.

Figure 12A:
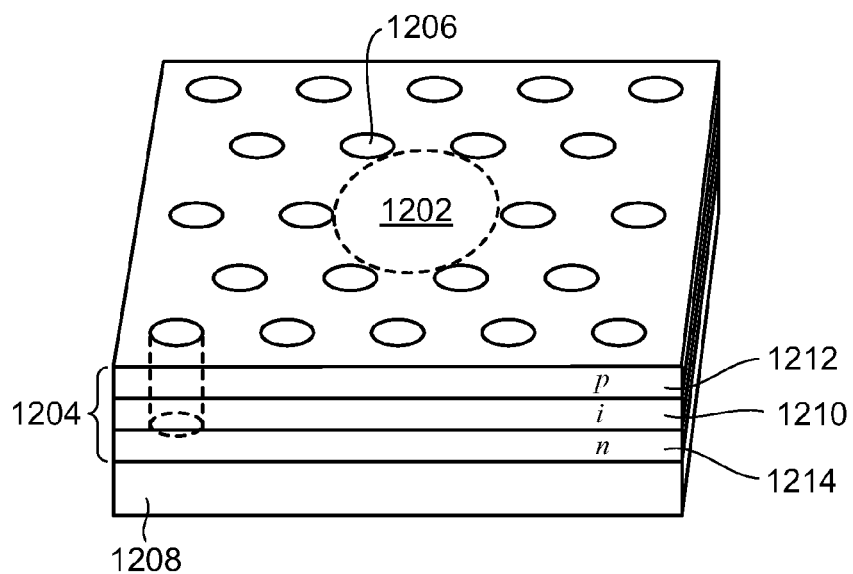
FIG. 12A shows an isometric view of a resonant cavity configured in accordance with embodiments of the present invention.

FIG. 12A shows a resonant cavity 1202 and portion of slab 1204 configured in accordance with embodiments of the present invention. The resonant cavity 1202 is created by omitting a cylindrical hole. The diameter of the resonant cavity 1202 and the pattern and diameter of cylindrical holes surrounding the resonant cavity 1202, such as cylindrical hole 1206, can be selected to temporarily trap a specific wavelength of an optical signal within the resonant cavity 1202. The slab 1204 is located on top of a glass substrate 1208. As shown in FIG. 12A, in certain embodiments, the slab 1204 may be comprised of an intrinsic layer 1210 sandwiched between a p-type semiconductor layer 1212 and an n-type semiconductor layer 1214 forming a p-i-n junction resonant cavity 1202.

Figure 12B:
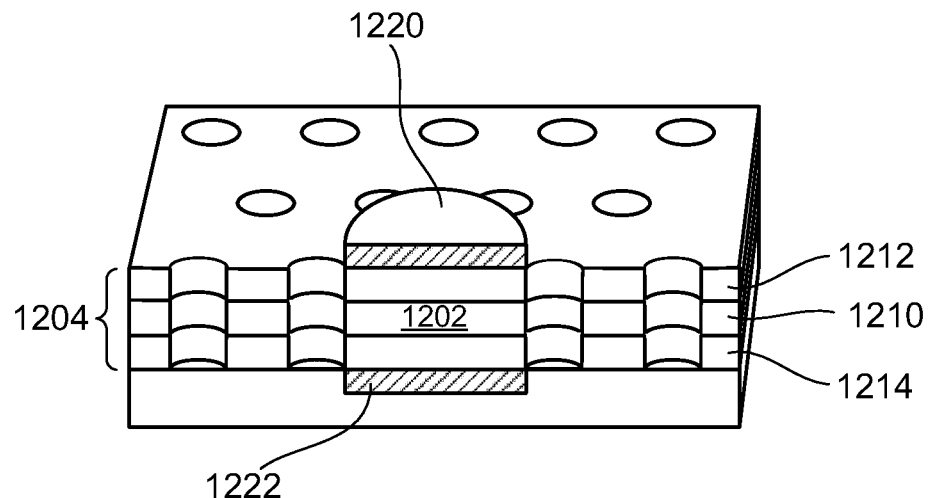
FIG. 12B shows a cross-sectional view of a first electronically tunable resonant cavity configured in accordance with embodiments of the present invention.

FIG. 12B shows a cross-sectional view of a first electronically tunable resonant cavity configured in accordance with embodiments of the present invention. The resonant cavity 1202 is sandwiched between two electrodes 1220 and 1222. The slab 1204 can be comprised of the p-i-n junction layers 1210, 1212, and 1214 or a single dielectric or semiconductor layer. Applying a voltage across the resonant cavity 1202 changes the effective refractive index of the resonant cavity 1202, which can be shift the resonant cavity 1202 into or out of resonance with a particular wavelength of an optical signal propagating in a nearby waveguide (not shown).

Figure 12C:
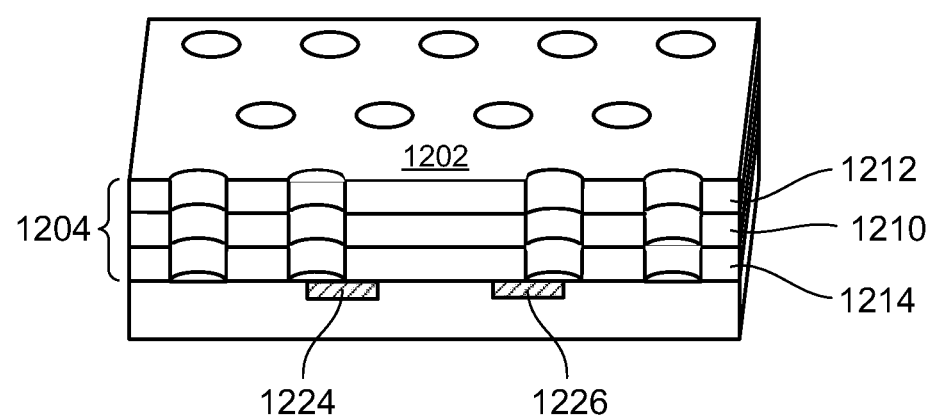
FIG. 12C shows a cross-sectional view of a second electronically tunable resonant cavity configured in accordance with embodiments of the present invention.

FIG. 12C shows a cross-sectional view of a second electronically tunable resonant cavity configured in accordance with embodiments of the present invention. The resonant cavity 1202 is sandwiched between on two electrodes 1224 and 1226. The slab 1204 can also be comprised of the pin layers 1210, 1212, and 1214 or a single layer, such as a single dielectric or semiconductor layer. Applying a voltage across the resonant cavity 1202 changes the effective refractive index of the resonant cavity 1202, which can shift the resonant cavity 1202 into or out of resonance with a particular wavelength of an optical signal propagating in a nearby waveguide (not shown).

In certain embodiments, a resonant cavity can be operated as an electronically tunable photodetectors by placing a detector, such as detector 902 described above, adjacent to the resonant cavity.

Note that system embodiments of the present invention are not limited to microring resonators and photonic crystal resonant cavities. In other embodiments, any suitable resonator that can be configured to couple with a particular wavelength of an optical signal propagating along the waveguide can be used.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An optoelectronic switch comprising:
    a set of roughly parallel input waveguides;
    a set of roughly parallel output waveguides positioned roughly perpendicular to the input waveguides, each output waveguide crossing the set of input waveguides; and
    at least one switch element to switch one or more optical signals transmitted on one or more input waveguides onto one or more crossing output waveguides, wherein the at least one switch element comprises:
        a set of electronically tunable input resonators, each input resonator optically coupled to an input waveguide, each input resonator to couple an optical signal from the input waveguide when an appropriate voltage is applied to the input resonator;
        a set of electronically tunable output resonators, each output resonator optically coupled to an output waveguide and a power waveguide, each output resonator to couple an optical signal from the power waveguide onto the output waveguide when an appropriate voltage is applied to the output resonator;
        a receiver electronically coupled to each of the input resonators, the receiver to transmit electronic signals corresponding to the optical signals coupled from the input waveguide;
        an electronic interconnect electronically coupled to the receiver, the electronic interconnect to reroute the electronic signals transmitted by the receiver; and
        a transmitter electronically coupled to the electronic interconnect and the set of output resonators, the transmitter to receive the rerouted electronic signals output from the electronic interconnect and apply the correspondingly appropriate voltage to the output resonators.

2. The switch of claim 1 further comprises:
    a source waveguide;
    a set of power waveguides, each power waveguide optically coupled to the source waveguide, extending roughly parallel to an output waveguide in the set of output waveguides, and crossing roughly perpendicular each input waveguide in the set of input waveguides; and an optical power source optically coupled to the source waveguide, the optical power source to emit one or more continuous wave optical signals onto each of the power waveguides in the set of power waveguides via the optically coupled source waveguide.

3. The switch of claim 2 wherein the source waveguide and the power waveguide are ridge waveguides or photonic crystals waveguides.

4. The switch of claim 1 further comprises:
a set of input ports, each input port optically coupled to an input waveguide in the set of input waveguides, each input port to emit the one or more optical signals onto the input waveguide; and
a set of output ports, each output port optically coupled to an output waveguide in the set of output waveguides, each output port to receive one or more optical signals transmitted on the output waveguide.

5. The switch of claim 1 wherein the input waveguides and the output waveguides further comprise ridge waveguides or photonic crystal waveguides.

6. The switch of claim 1 wherein the set of input waveguides are formed in a first optical layer and the set of output waveguides are formed in second optical layer.

7. The switch of claim 1 wherein the set of input waveguides and the set of output waveguides are formed in a single optical layer such that the crossing input and output waveguides intersect.

8. The switch of claim 1, wherein the at least one switch element further comprises a set of detectors, each detector positioned adjacent to an input resonator, each detector to convert the optical signal coupled from the input waveguide into the electronic signal transmitted by the receiver.

9. The switch of claim 1, wherein the electronic interconnect further comprises one of:
direct electrical connections; and
an electronic crossbar.

10. The switch of claim 1, wherein the electronic interconnect further comprises a packet buffer for storing data packets.

11. The switch of claim 1, wherein the resonators further comprise one of:
microring resonators; and
resonant cavities.

12. The switch of claim 4 wherein each input port and each output port is optically coupled to one of:
a processor;
memory;
a circuit board;
a server;
a storage server;
an external network connection; or
any other data processing, storing, or transmitting device.

13. A switch element, comprising:
a power waveguide to transmit one or more continuous wave optical signals;
an output waveguide positioned roughly parallel to the power waveguide;
an input waveguide crossing the output waveguide;
an optoelectronic device to couple one or more input optical signals from the input waveguide, couple one or more of the continuous wave optical signals from the power waveguide, encode information encoded in the one or more input optical signals into the one or more continuous wave optical signals to produce output optical signals, and couple the output optical signals onto the output waveguide, wherein the optoelectronic device further comprises:
a set of electronically tunable input resonators, each input resonator optically coupled to the input waveguide, each input resonator to coupled one of the one or more input optical signals from the input waveguide when an appropriate voltage is applied to the input resonator;
a set of electronically tunable output resonators, each output resonator optically coupled to the output waveguide and the power waveguide, each output resonator to couple the continuous wave optical signal from the power waveguide onto the output waveguide when an appropriate voltage is applied to the output resonator;
a receiver electronically coupled to each of the input resonators, the receiver to transmit electronic signals corresponding to the one or more input optical signals coupled from the input waveguide;
an electronic interconnect electronically coupled to the receiver, the electronic interconnect to reroute the electronic signals transmitted from the receiver; and
a transmitter electronically coupled to the electronic interconnect and the set of output resonators, the transmitter to receive the rerouted electronic signals output from the electronic interconnect and apply the correspondingly appropriate voltage to the output resonators in order to encode information encoded in the one or more input optical signals into the one or more continuous wave optical signals to produce the output optical signals.

14. The switch element of claim 13, further comprising: a set of detectors, each detector positioned adjacent to an input resonator, each detector to convert the optical signal coupled from the input waveguide into the electronic signal transmitted by the receiver.

15. The switch element of claim 13, further comprising: retiming logic to synchronize the electronic signals transmitted from the electronic interconnect to the transmitter.

16. The switch element of claim 13, wherein the waveguides further comprise one of:
a ridge waveguide; and
a photonic crystal waveguide.

17. The switch element of claim 13, wherein the resonators further comprise one of:
microring resonators; and
resonant cavities.

18. An optoelectronic switch comprising:
a set of roughly parallel input waveguides;
a set of roughly parallel output waveguides positioned roughly perpendicular to the set of roughly parallel input waveguides; and
at least one switch element to switch one or more optical signals transmitted on one or more of the set of roughly parallel input waveguides onto one or more of the set of roughly parallel output waveguides, wherein the at least one switch element comprises:
a set of input resonators, each input resonator of the set of input resonators optically coupled to an input waveguide of the set of roughly parallel input waveguides, each input resonator to couple an optical signal from the input waveguide;
an electronic interconnect to route electronic signals corresponding to the optical signal from the input waveguide, the electronic signals including encoded data corresponding to the optical signal; and a set of output resonators, each output resonator of the set of output resonators optically coupled to an output waveguide of the set of roughly parallel output waveguides, each output resonator to couple the optical signal corresponding to the electronic signal routed by the electronic interconnect onto the output waveguide.

* * * * *

UNITED STATES PATENT AND TRADEMARK OFFICE
CERTIFICATE OF CORRECTION

PATENT NO. : 8,938,139 B2  
APPLICATION NO. : 12/921768  
DATED : January 20, 2015  
INVENTOR(S) : Moray McLaren et al.

Page 1 of 1

It is certified that error appears in the above-identified patent and that said Letters Patent is hereby corrected as shown below:

On the title page, in item (75), Inventors, in column 1, line 4, delete "Coatville" and insert -- Coatesville --, therefor.

On the title page, in item (56), Primary Examiner, in column 2, line 1, delete "Charles Y Peng" and insert -- Charlie Y Peng --, therefor.

Signed and Sealed this  
Fourth Day of August, 2015

Michelle K. Lee  
*Director of the United States Patent and Trademark Office*